(12) United States Patent
Suzuki et al.

(10) Patent No.: US 8,305,940 B2
(45) Date of Patent: Nov. 6, 2012

(54) TELEPHONE SUPPLEMENTARY SERVICE COMMUNICATION CONTROL SYSTEM

(75) Inventors: Tomohiro Suzuki, Kawasaki (JP); Joji Furuya, Kawasaki (JP); Kazuyoshi Kondo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 388 days.

(21) Appl. No.: 12/635,829

(22) Filed: Dec. 11, 2009

(65) Prior Publication Data

US 2010/0135183 A1 Jun. 3, 2010

Related U.S. Application Data

(63) Continuation of application No. PCT/JP2007/062043, filed on Jun. 14, 2007.

(51) Int. Cl.
*H04Q 11/00* (2006.01)
*H04M 1/00* (2006.01)
*H04N 7/16* (2011.01)

(52) U.S. Cl. .................... 370/271; 379/157; 725/153

(58) Field of Classification Search .................. None
See application file for complete search history.

(56) References Cited

U.S. PATENT DOCUMENTS 5,936,679 A * 8/1999 Kasahara et al. ............ 348/553
2006/0251060 A1 11/2006 Iwakawa et al.

FOREIGN PATENT DOCUMENTS

| JP | 11-298617 | 10/1999 |
|---|---|---|
| JP | 2004-165949 | 6/2004 |
| JP | 2006-270837 | 10/2006 |

OTHER PUBLICATIONS

International Search Report dated Oct. 2, 2007, from the corresponding International Application.

* cited by examiner

*Primary Examiner* — Clemence Han
(74) *Attorney, Agent, or Firm* — Katten Muchin Rosenman LLP

(57) ABSTRACT

A telephone service, particularly a telephone supplementary service communication system having an IP telephone control apparatus and an IP telephone terminal. A telephone supplementary service communication control system for the service communicate system is comprised of a specified voice terminal and a plurality of telephone supplementary service terminals registered to link with the same and including a communication control apparatus registering linking of the specified voice terminal and the plurality of telephone supplementary service terminals as a single virtual terminal and managing and controlling the running and termination of these linked terminals, wherein the communication control apparatus comprises a supplementary service starting unit monitoring the communication start state of the voice terminal and starting the supplementary service by the telephone supplementary service terminal linked with the voice terminal.

8 Claims, 13 Drawing Sheets

TELEPHONE SUPPLEMENTARY SERVICE COMMUNICATION CONTROL SYSTEM

CROSS-REFERENCE TO RELATED APPLICATION

This application is a continuation of International Application PCT/JP2007/062043, filed on Jun. 14, 2007, the contents of which are herein wholly incorporated by reference.

FIELD

The embodiments discussed herein are applied to telephone services, particularly, IP telephone control apparatuses and IP telephone terminals.

BACKGROUND

The telephone services of the related art are based on voice communication using telephones, so when using videophones or other supplementary services, special terminals (dedicated hardware or dedicated software) separate from the telephones that have been used so far have had to be prepared. At that time, when the user wished to use a supplementary service after communication with a telephone had begun, the user had to hang up the telephone and then redial with the special terminal.

Accordingly, technology has been proposed which stores in advance media that can be accessed by a user and can be handled by a plurality of terminals, manages the plurality of terminals as a single virtual terminal, determines the media corresponding to an event upon occurrence of the event, and selects the terminal corresponding to this media from among the plurality of terminals (refer to Patent Document 1).

An overview of an example of operation is described below. FIG. 1 is a view explaining the operation of Patent Document 1 in brief.

In a communication system 1, terminals usable by user A or B are controlled virtually as single terminals. When the user A calls user B by a videophone call from a videophone terminal 2, the user B cannot utilize a videophone terminal, but can utilize voice and video separately at the terminals 4 and 5, so video communication is begun between the videophone terminal 2 of the user A and the voice terminal 4+supplementary service terminal 5 of the user B.

Patent Document: Japanese Laid-Open Patent Publication No. 2006-270837

However, the above-mentioned technology had the following issues. FIG. 2 is a view for explaining the issues of the related art.

(1) The user has no way of knowing what supplementary service communication media (video terminal etc.) is available with the other user before the connection of the supplementary service.

(2) A registered predetermined communication terminal is selected according to a priority rank held in advance in the communication system 1, so the user is unable to dynamically select a communication terminal according to the other user or the usage situation.

(3) When the speech communication session by the voice terminal ends, the user also has to separately carry out end processing for the currently established supplementary service communication media.

For example, there is no way of knowing what supplementary service communication media the other user supports, so even if in an environment where file sharing is possible, there is no way of knowing if file sharing is possible until actual connection of the supplementary service is set up.

Further, a terminal is automatically selected according to a priority rank stored in advance in a terminal control unit of the communication system 1, so, for example, even when the user A can access communication media for the same supplementary service (video) by a plurality of terminals (video phone terminal) 2 and (supplementary service terminal) 3 and also when the user A wishes to receive the video only for a certain call on a wide-screen terminal 3 (low priority), the user A will only be able to select the videophone terminal 2 of high priority preferentially.

SUMMARY

According to a first aspect of the embodiment, to deal with the above issues, there is provided a telephone supplementary service communication system wherein a user can separately select and run non-voice media communication, provided with a supplementary service starting means for associating with voice communication in an environment where, in addition to a voice terminal, a supplementary service terminal is available.

According to a second aspect of the embodiment, in addition to the supplementary service starting means of the first aspect, there is further provided a means for notifying the user of what supplementary service is available between users communicating by voice.

According to a third aspect of the embodiment, in addition to the second aspect, there is further provided a means for displaying the notified supplementary service on the supplementary service terminal so the user can select a communication media of the supplementary service.

According to a fourth aspect of the embodiment, in addition to the first aspect, there is provided a means for terminating the supplementary service responding to the termination of the voice communication.

According to the embodiments, in comparison to a telephone supplementary service communication system of the related art (Japanese Laid-Open Patent Publication No. 2006-270837), more convenient system for a user can be attained. Specifically, it is possible to know in advance what communication media can be used with another user, and thus it becomes possible to determine the type of communication media and timing when initiating the communication media as well by the actions of the user. Thereby, realization of a friendly service easy for an intuitive use by the user is possible, which greatly contributes to expand telephone supplementary services.

BRIEF DESCRIPTION OF DRAWINGS

These and other objects and features of the embodiments will become clearer from the following description given with reference to the attached drawings, wherein.

DESCRIPTION OF EMBODIMENTS

Figure 1:
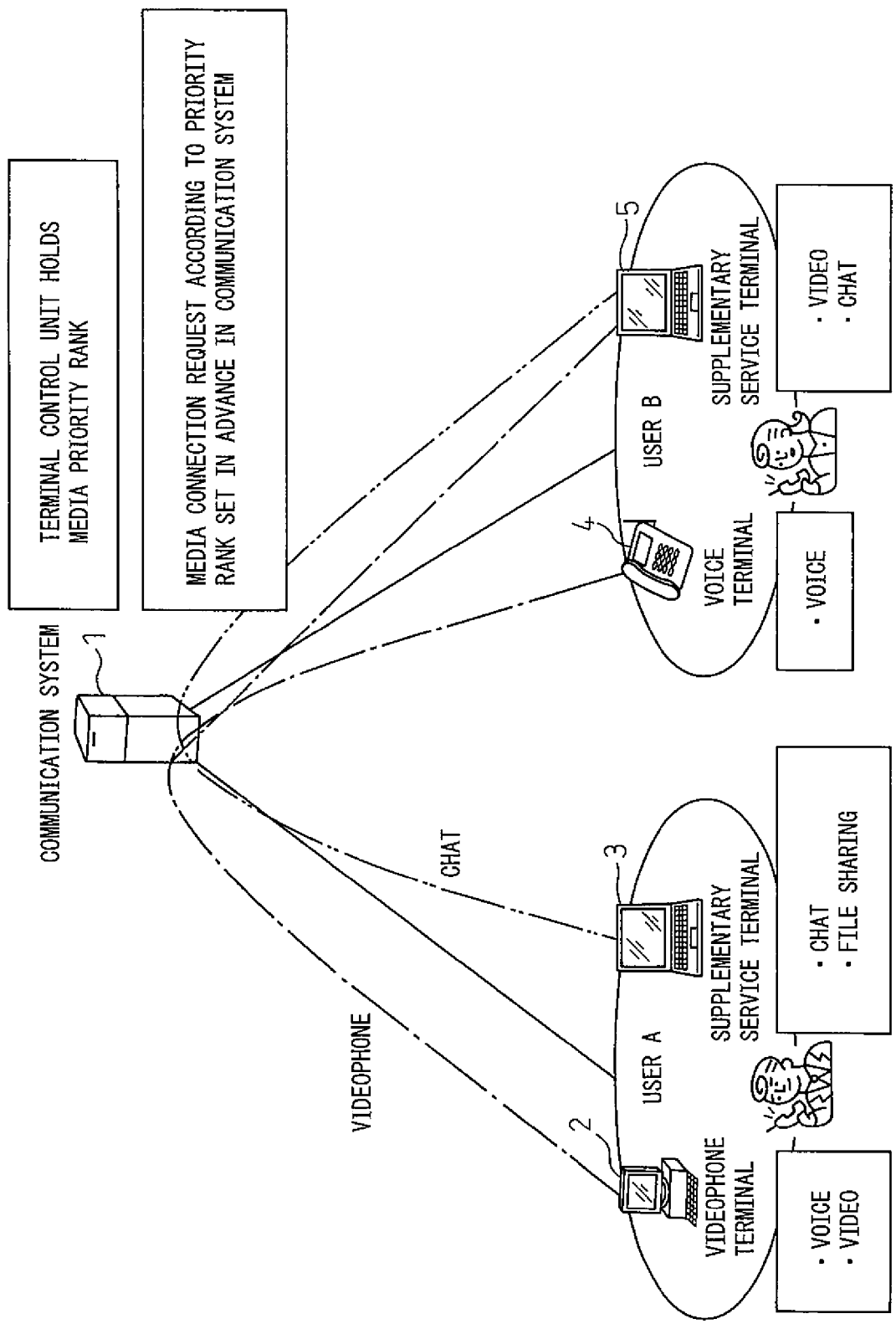
FIG. 1 is a view explaining the operation of Patent Document 1 in brief.
Figure 2:
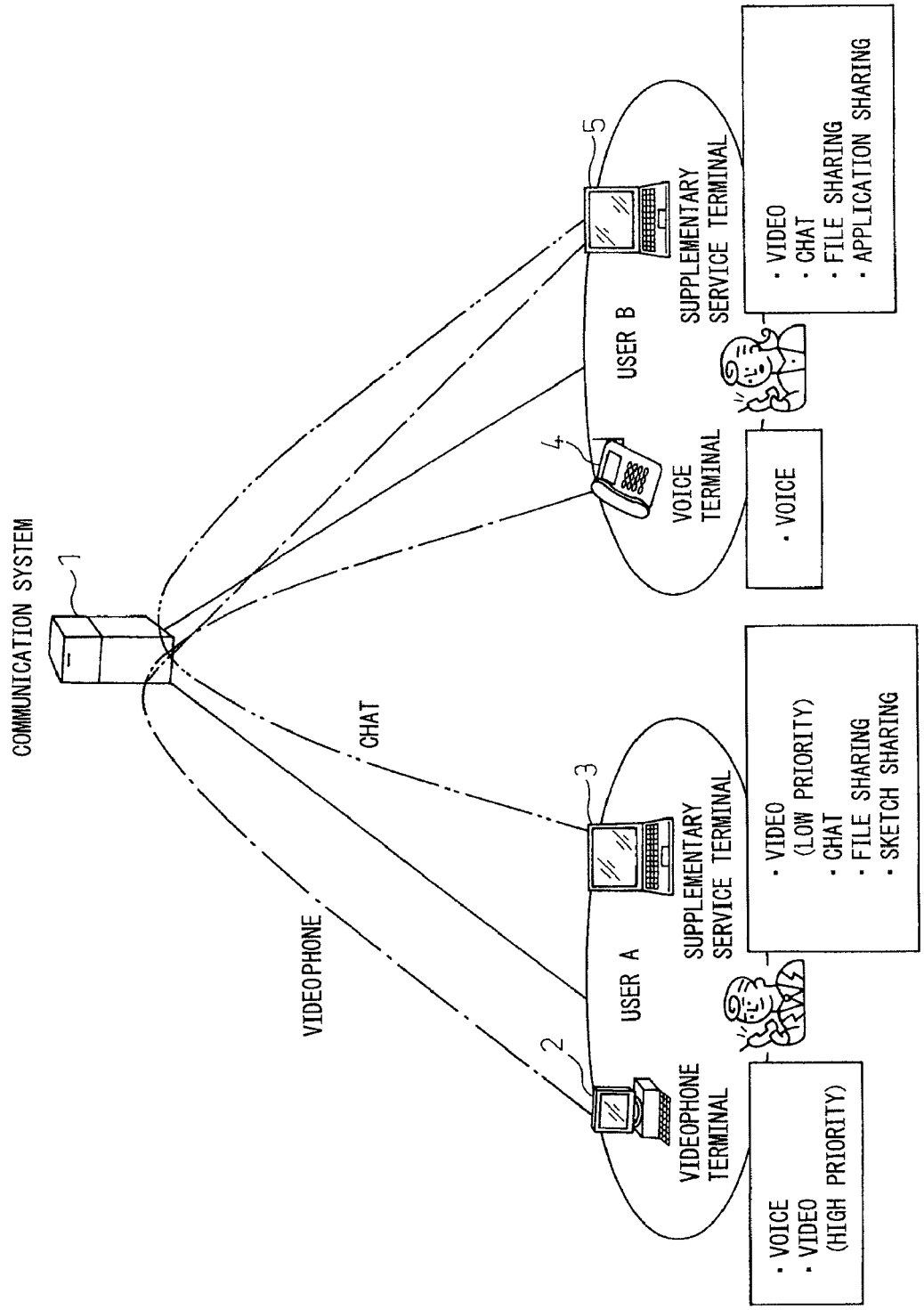
FIG. 2 is a view for explaining the issues of the related art.
Figure 3:
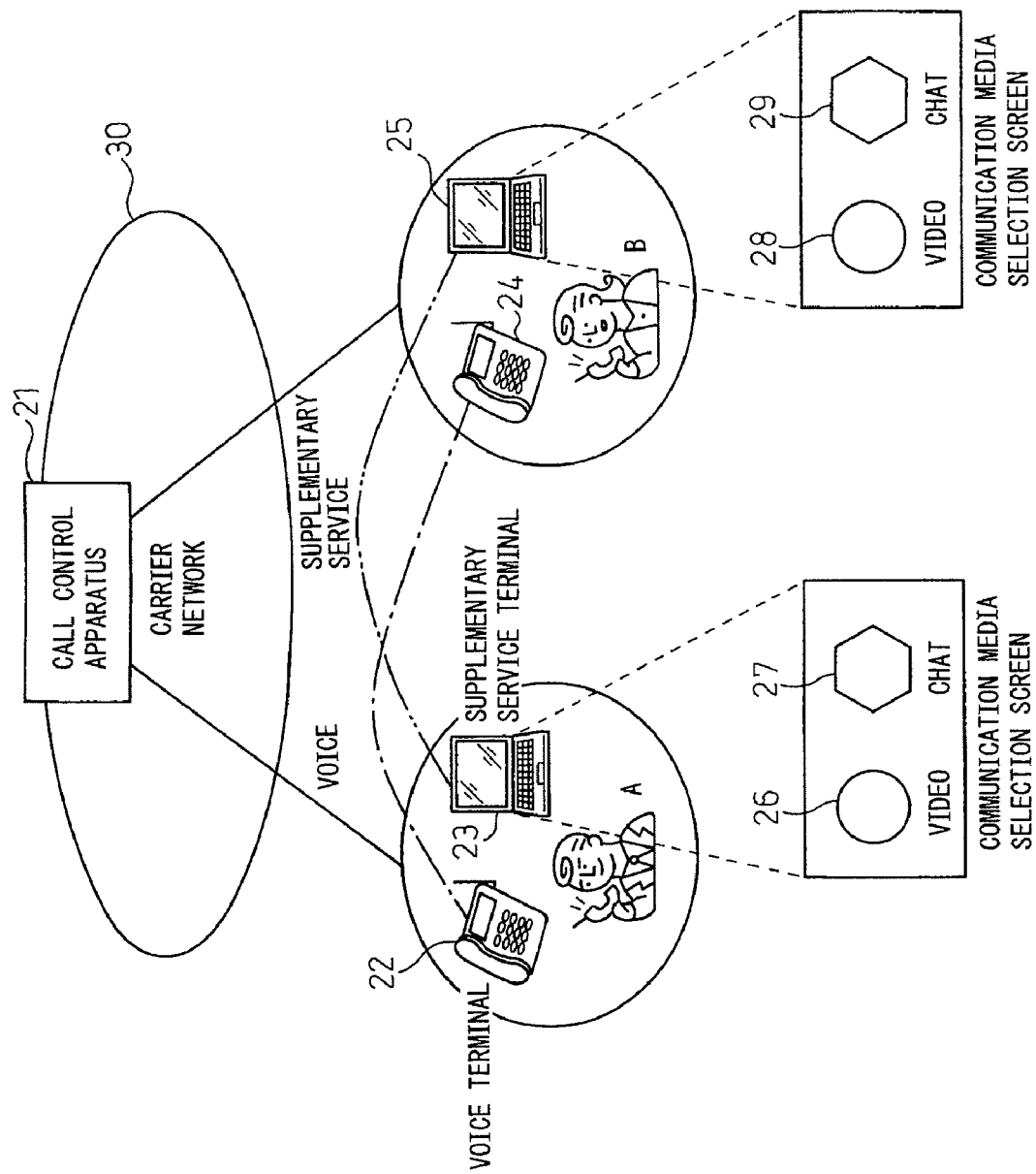
FIG. 3 is a view illustrating an example of a system configuration according to the embodiments.

FIG. 3 illustrates an example of a system configuration which may be realized the present embodiments.

The system is comprised of a call control apparatus 21, installed within the network of a carrier, controlling telephones (22, 24) and supplementary service terminals 23, 25, voice terminals 22, 24 (may also support non-voice media) receiving telephone service, and supplementary service terminals 23, 25 such as PCs provided with various devices for accessing non-voice supplementary services that cannot be accessed by the telephones 22, 24, such as displays, input devices, and program execution devices. Note that, the supplementary service terminals 23 and 25 may be included in the voice terminals 22 and 24 and a plurality of supplementary service terminals 23 and 25 may also be provided.

Further, the drawing illustrates, as examples of notification/selection screens for communication media (see the second embodiment and third embodiment), notification/selection icons 26 and 28 for a video function indicated on the display of the supplementary service terminals 23 and 25 and notification/selection icons 27 and 29 for a chat function. User A or B click on the icon for a notified currently available function (video function icons 26 and 28 or chat function icons 27 and 29) to enable the start of the corresponding supplementary service associated with the voice service at the call control apparatus 21 (see the first embodiment). Finally, if the call control apparatus 21 detects that voice communication between the users A, B has ended, the provided supplementary service (video function or chat function) that is linked to the voice communication will also end accordingly (refer to the fourth embodiment).

Figure 4:
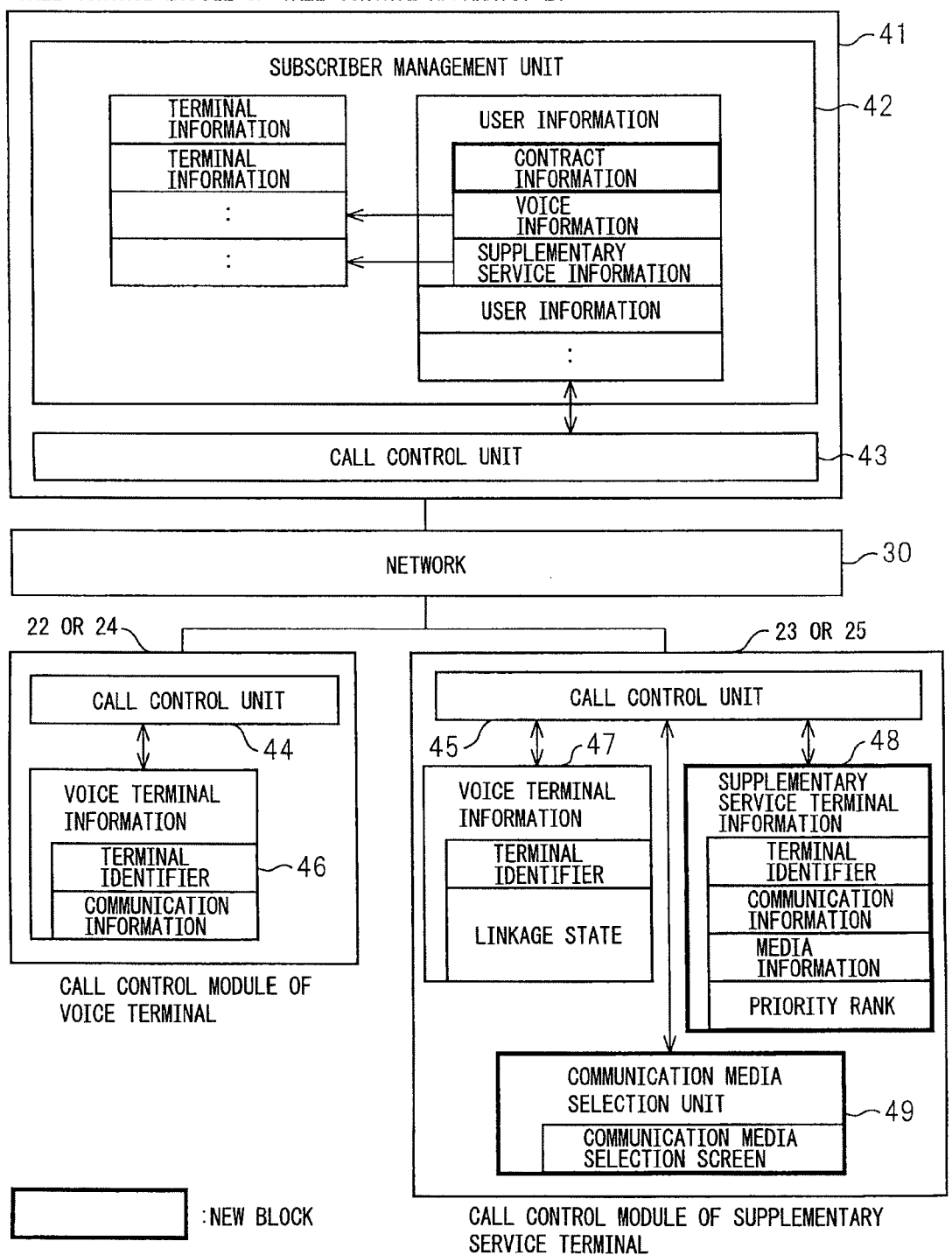
FIG. 4 is a view schematically illustrating functional blocks according to the embodiments.

FIG. 4 is a view schematically illustrating functional blocks according to the present embodiments. The bold frames in the drawing illustrate functional blocks which are newly added according to the embodiments.

"Terminal information" in a subscriber management unit 42 of a call control module 41 in the call control apparatus 21 (refer to FIG. 3) manages the physical configuration of the terminals of each subscriber and manages "voice information" and "supplementary service information". "Contract information" is service contract information agreed on between the carrier managing the call control apparatus 21 (refer to FIG. 3) and each subscribed user. "User information" manages the terminals that are available to the user as a single virtual terminal in addition to the contract information, and "voice information" and "supplementary service information" are mapped in respective "terminal information" for managing the physical configuration.

"Terminal identifier" of a supplementary service terminal information unit 48 in the supplementary service terminals 23, 25 is an identifier consisting of a telephone number, URI, or the like for uniquely identifying a terminal. "Communication information" is network information such as an IP address, port number, or the like necessary for communication. "Media information" is information such as the name of the communication media and the media type. Further, "priority" is information, used in a case when a plurality of terminals are available for the same media, for identifying which terminal is given priority to be used. Further, "linkage state" of a voice terminal information unit 47 depicts the contents of a state where the supplementary service terminals 23, 25 and voice terminals 22, 24 are linked, which contents (registering or deleting linkage) are registered in the call control apparatus 21.

The subscriber management unit 42 of the call control apparatus 21 holds the "contract information" which is used to check that unauthorized "supplementary service linkage states" cannot be registered from the supplementary service terminals 23, 25. Further, in the supplementary service terminals 23, 25, "priority" and other supplementary service information is held by the supplementary service terminals, which is registered in the subscriber management unit 42 of the call control apparatus 21 when registering the "supplementary service linkage state".

Further, the supplementary service terminal 23, 25 side is provided with a communication media selection unit 49 which displays the media on a communication media selection screen, notified by a "supplementary service availability notification" from the call control apparatus 21, that media is available for communication with the other user. This enables the user to select and run the service function icons 26 to 29 (refer to FIG. 3).

Below, specific examples of the first to fourth embodiments will be explained.

1) First Embodiment

Starting Means for Supplementary Service Associated with Voice Communication The call control apparatus 21 is, as mentioned above, provided with a subscriber management unit 42 and a call control unit 43. The subscriber management unit 42 manages the following types of information: (a) contract information of the subscriber, (b) terminal information managing communication media which is supported by the voice terminal and supplementary service terminal and priority, and (c) user information managing the terminals available to the user.

The supplementary service terminal 23 or 25 follows the registration steps for the "supplementary service linkage state" to register in the call control apparatus 21 the "voice information" showing the voice terminal 22 or 24 associated with the supplementary service terminal 23 or 25 and "supplementary service information" showing the supporting communication media and priority. When carrying out this registration, the contract information is checked and registrations that are in conflict with the contract are denied.

When communication between the voice terminals 22 and 24 of the calling user and the called user begins, the call control unit 43 of the call control apparatus 21 refers to the subscriber management unit 42 and judges if a supplementary service terminal 23 or 25 linked with the communicating voice terminal 22 or 24 is available. If the supplementary service terminal 23 or 25 is available, the available supplementary service is selected and a "supplementary service availability notification" is sent to the supplementary service terminal. This triggers the start of a supplementary service associated with the voice communication.

Figure 5:
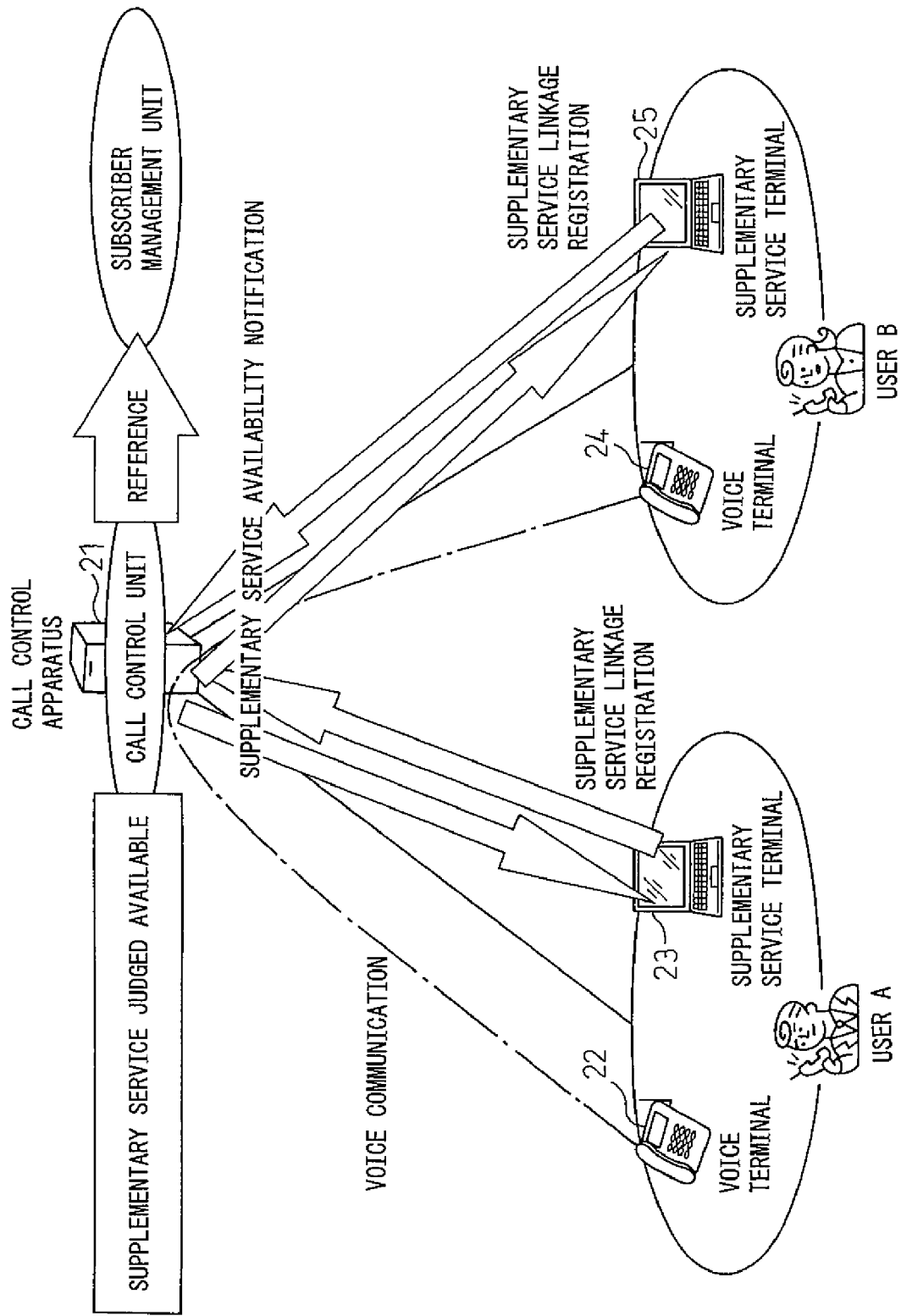
FIG. 5 is a view illustrating an example of supplementary service availability notification according to the embodiments.

FIG. 5 illustrates an example of a "supplementary service linkage registration" request from the supplementary service terminal 23 or 25 for the call control apparatus 21 and a "supplementary service availability notification" from the call control apparatus 21 to the supplementary service terminal 23 or 25. Note that, the "supplementary service linkage registration" and "voice communication" can be carried out in any order.

2) Second Embodiment

Means for Notifying the Available Supplementary Service

If starting voice communication, the terminal information inside the subscriber management unit 42 that relates to both users is read out. When a supplementary service terminal linked with the voice terminal is available, the supplementary service media that is available between both users is extracted. When a plurality of supplementary service terminals is available for the same supplementary service media, the supplementary service terminal with the higher priority is selected. Further, a "supplementary service availability notification" is sent to the supplementary service terminal corresponding to the supplementary service media.

A case where "supplementary service linkage registration" is carried out after voice communication starts may also occur. In this case, it is confirmed if the voice terminal to be linked, at the time of the "supplementary service linkage registration", is in communication. When it is confirmed to be in communication, terminal information inside the subscriber management unit 42 relating to both users is read similar to the above, and a "supplementary service availability notification" is sent to the available supplementary service terminal 23 or 25.

The "supplementary service availability notification" includes the following contents: (a) media type information used with the supplementary service and (b) supplementary service terminal identifier for the other user. Note that, the "supplementary service availability notification" is assumed to be sent to the supplementary service terminals linked with the caller and receiver voice terminals respectively. However, depending on the billing policy of the carrier and the like (the billing policy for the call originating user), the "supplementary service availability notification" can be sent only to the supplementary service terminal linked with the caller voice terminal.

Figure 6:
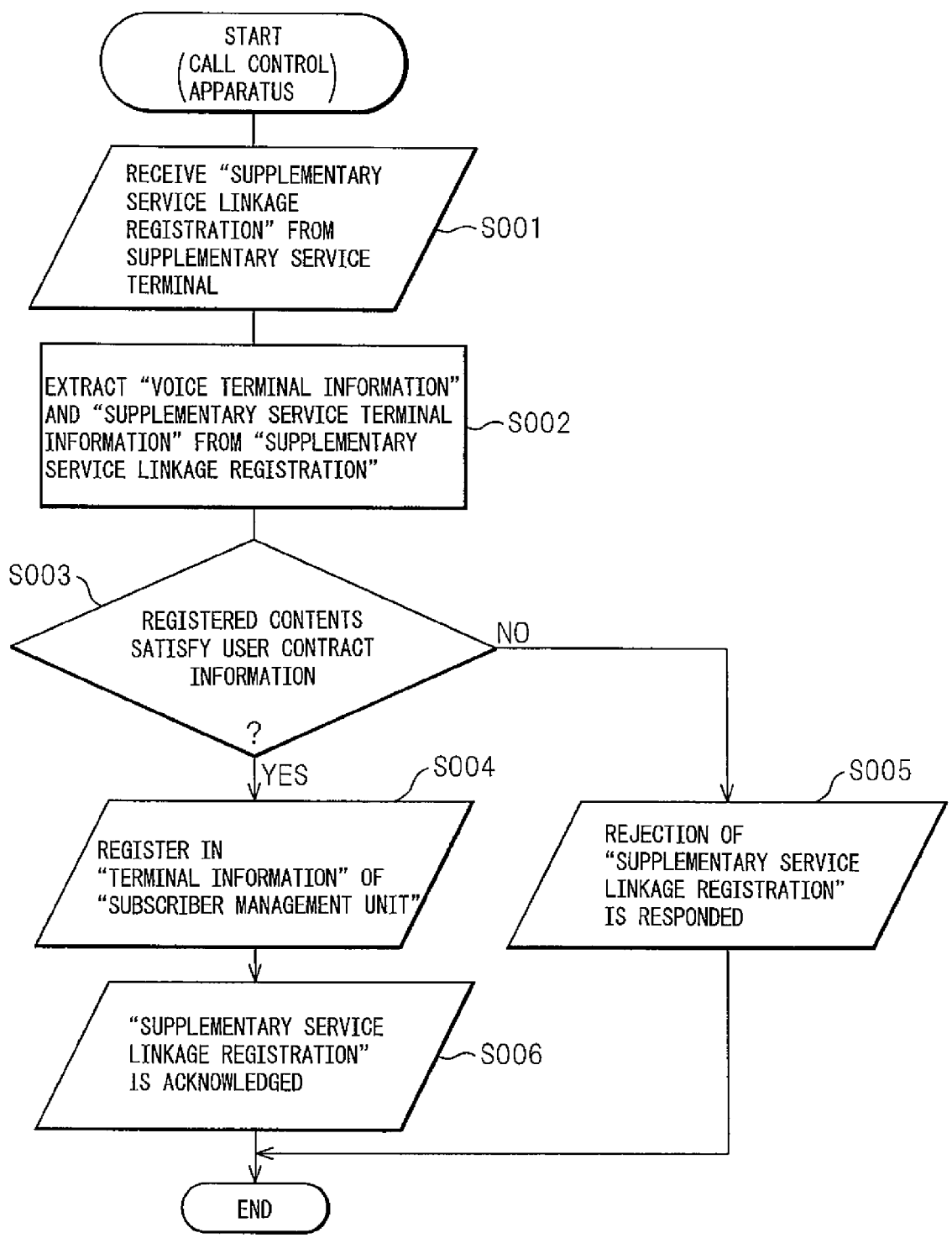
FIG. 6 is a view illustrating an example of the flow of supplementary service linkage registration.
Figure 7:
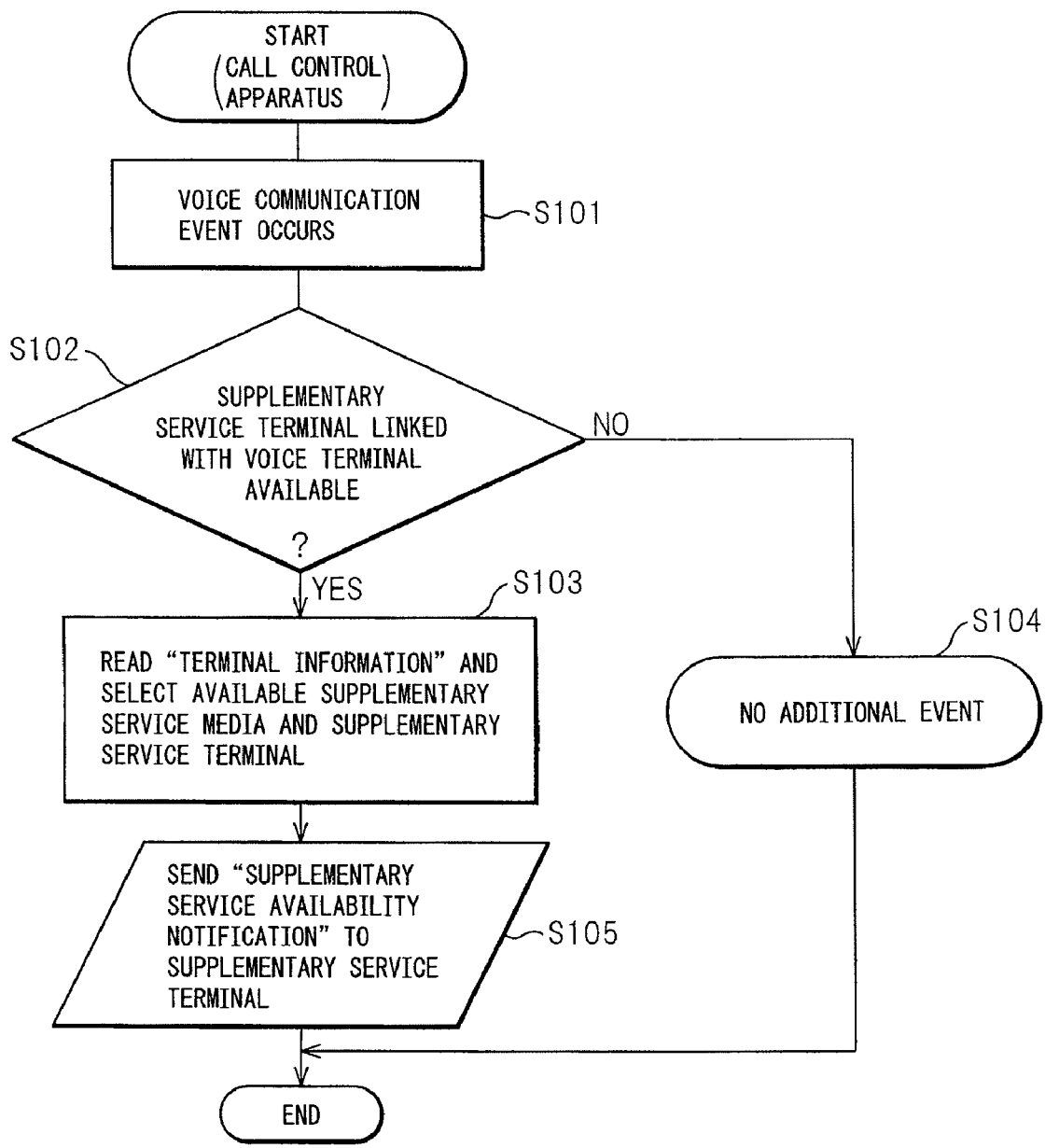
FIG. 7 is a view illustrating an example of the flow of supplementary service availability notification.
Figure 8:
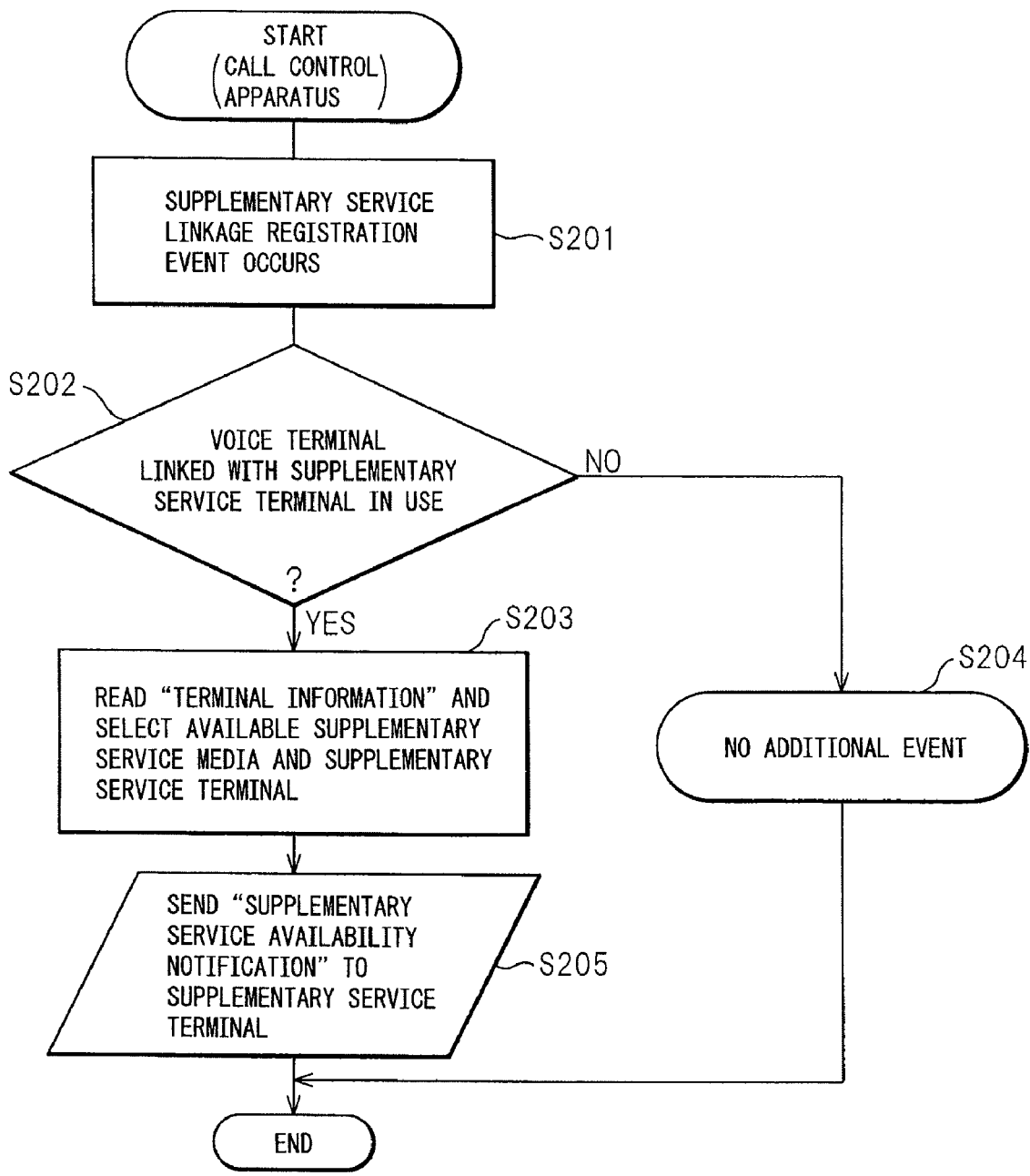
FIG. 8 is a view illustrating a different example of the flow of supplementary service availability notification.

FIGS. 6 to 8 illustrate examples of the flow of processing relating to the first embodiment and second embodiment. Of these, FIG. 6 illustrates an example of the flow of supplementary service linkage registration. Further, FIG. 7 illustrates an example of the flow of a supplementary service availability notification, and FIG. 8, a different example of the flow of a supplementary service availability notification.

In FIG. 6, if the call control apparatus 21 receives a "supplementary service linkage registration" from the supplementary service terminals 23 and 25 (S001), "voice terminal information" and "supplementary service terminal information" are extracted from the received "supplementary service linkage registration" (S002). Then, it is checked whether the registered content satisfies the user contract information (S003). When satisfied, the content is registered in the "terminal information" of the subscriber management unit 42 (S004) and a response is sent indicating the completion of "supplementary service linkage registration" in the supplementary service terminals 23 and 25 (S006). On the other hand, when the check is not satisfied, a rejection response is returned with respect to the "supplementary service linkage registration" (S005).

Next, in the flow of a supplementary service availability notification of FIG. 7, when the occurrence of a voice communication event is detected by the call control apparatus 21 (S101), the terminal information of the subscriber management unit 42 is read and checked to confirm whether the supplementary service terminals 23, 25 linked with the voice terminals 22, 24 are available (S102). If available, the available supplementary service and supplementary service terminal are selected (S103) and a "supplementary service availability notification" is sent to the selected supplementary service terminals 23, 25 (S105). When the supplementary service terminal 23, 25 linked with the voice terminals 22, 24 are not available, no "supplementary service availability notification" is sent (S104) and the processing ends.

FIG. 8 is a view illustrating a different example of a flow of a supplementary service availability notification. The difference between FIG. 8 and FIG. 7 is that in FIG. 8, a supplementary service linkage registration event first occurs and then a check is achieved on the use state of the voice terminals 22, 24 linked with the supplementary service terminals 23, 25 (S201 and S202). Other steps (S203 to 5205) are the same as FIG. 7 (S103 to S105). This is, as explained in FIG. 5, because the "supplementary service linkage registration" and "voice communication" can be carried out in any order.

3) Third Embodiment

Display of Notified Supplementary Service

In the supplementary service terminals 23, 25, if a "supplementary service availability notification" is received from the call control apparatus 21, the supplementary service media available are displayed, based on the notification contents, on the "communication media selection screen" in the supplementary service terminals 23, 25.

The user is able to know through the "communication media selection screen" what kind of supplementary services 26 to 29 are available with the other user. The user clicks on a supplementary service icon displayed on the "communication media selection screen" to select and run a desired service. The call control apparatus 21 starts the service in accordance with standard supplementary service communication protocol.

Figure 9:
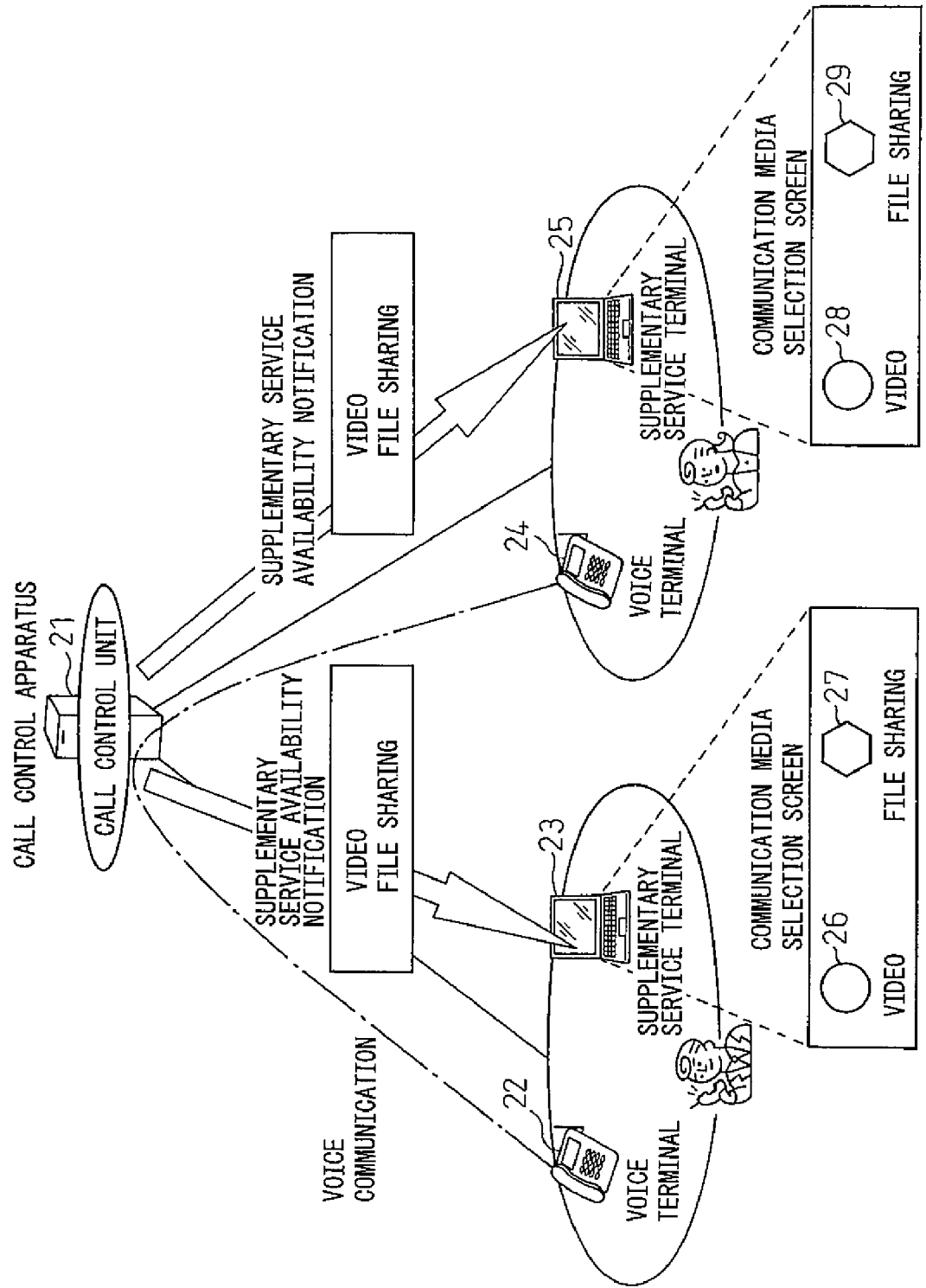
FIG. 9 is a view explaining the display of a notified supplementary service according to the embodiments.

FIG. 9 is a view for explaining the display of a notified supplementary service according to the present embodiment. The supplementary service terminals 23, 25 display the communication media available with the other user on the "communication media selection screen" based on the "supplementary service availability notification" notified from the call control apparatus 21.

Figure 10:
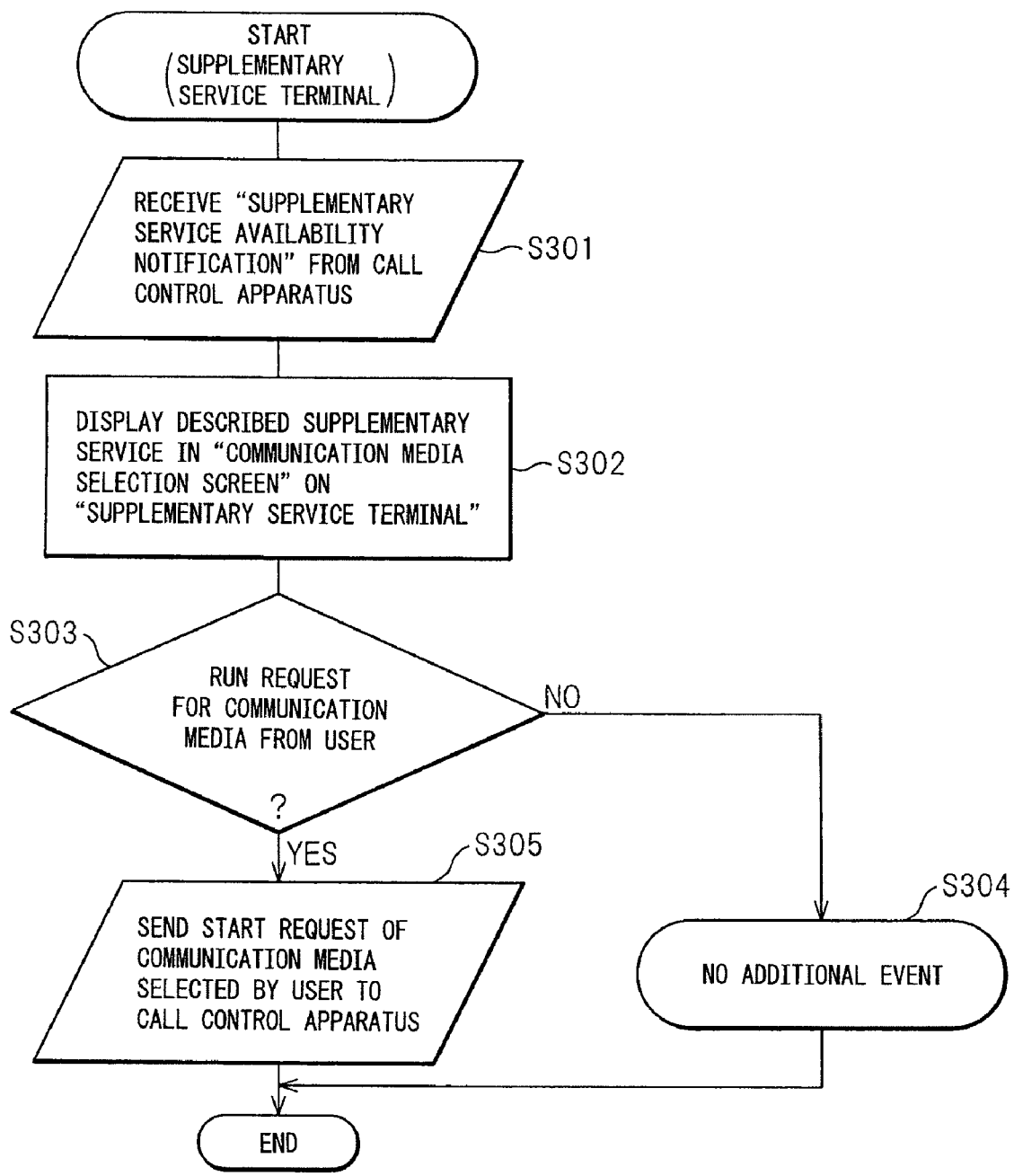
FIG. 10 is a view explaining a sequence of selecting a displayed supplementary service and starting it.

FIG. 10 is a view for explaining the sequence of selecting and starting a displayed supplementary service.

In FIG. 10, if the supplementary service terminals 23, 25 receive a "supplementary service availability notification" from the call control apparatus 21 (S301), the supplementary service that is described to be available in the notification is displayed on the "communication media selection screen" of the supplementary service terminals 23, 25 (S302). If the supplementary service terminals 23, 25 detect a click (run request) or the like by the user on the "communication media selection screen", the run request of the communication media selected by the user is sent to the call control apparatus 21 (S303 and 305). If there is no run request, the processing ends (S303 and 304).

4) Fourth Embodiment

Supplementary Service Termination Means

The call control unit 43 of the call control apparatus 21 manages the voice communication between the voice terminals 22, 24 and the supplementary service communication between the supplementary service terminals 23, 25 while linking the two communications. In order to disconnect the supplementary service communication linked with the voice communication, when the voice communication between the voice terminals is disconnected, it refers to the subscriber management unit 42, identifies the linked supplementary service terminal, and instructs supplementary service disconnection to disconnect the supplementary service.

Figure 11:
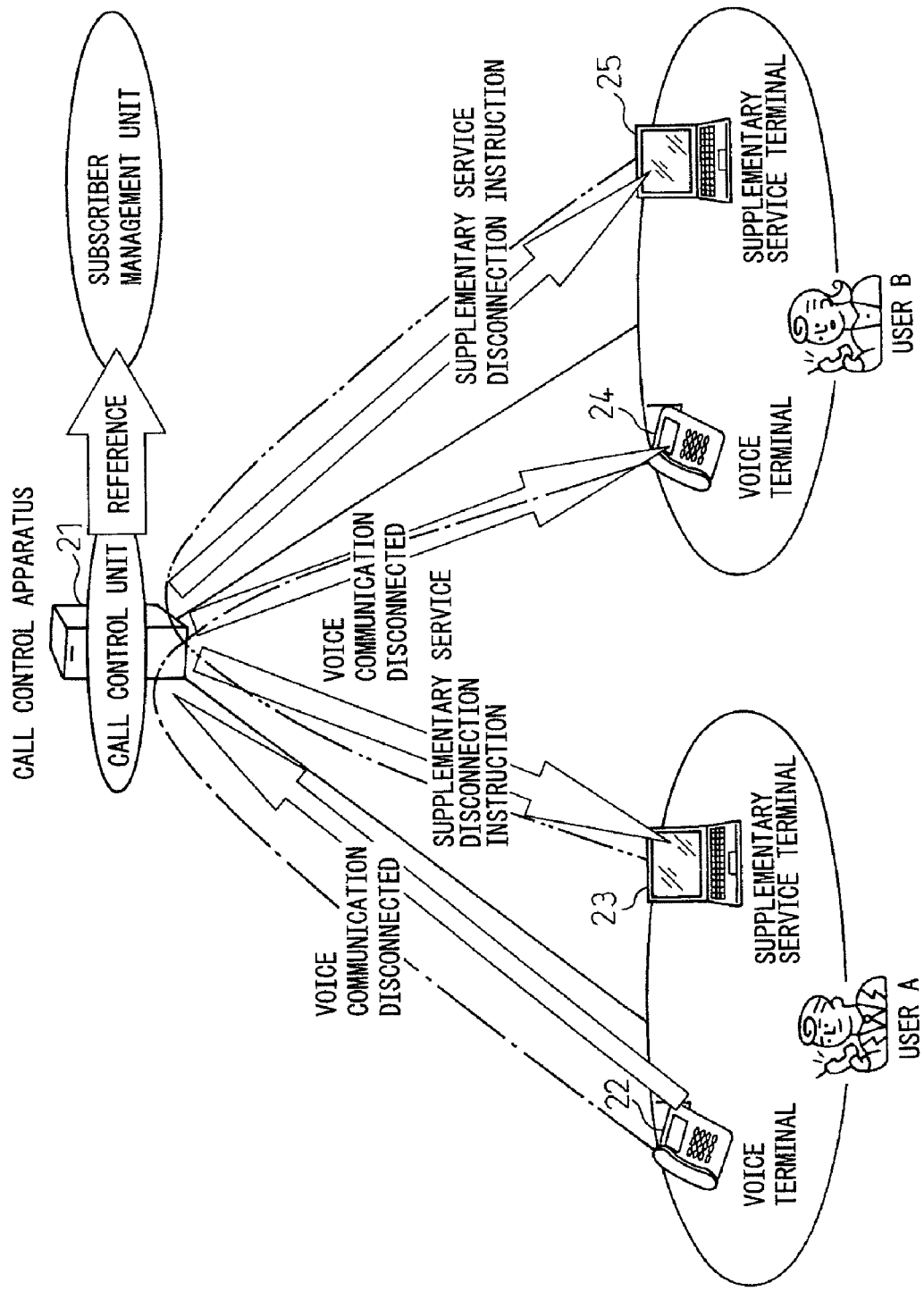
FIG. 11 is a view explaining a supplementary service termination means.

FIG. 11 is a view explaining the supplementary service termination means.

In FIG. 11, if the user A disconnects the voice communication via the voice terminal 22 first, the call control apparatus 21 detecting the disconnection sends a "disconnection instruction request" to the supplementary service terminal 23 that is registered linked with the voice terminal 22 of the user A, the voice terminal 24 of the user B who communicates with the user A, and the supplementary service terminal 25 registered linked with terminal 24. Due to this, in a communication environment where a plurality of terminals are run simultaneously, the termination of the registered linked terminals is prevented from being forgotten.

Figure 12:
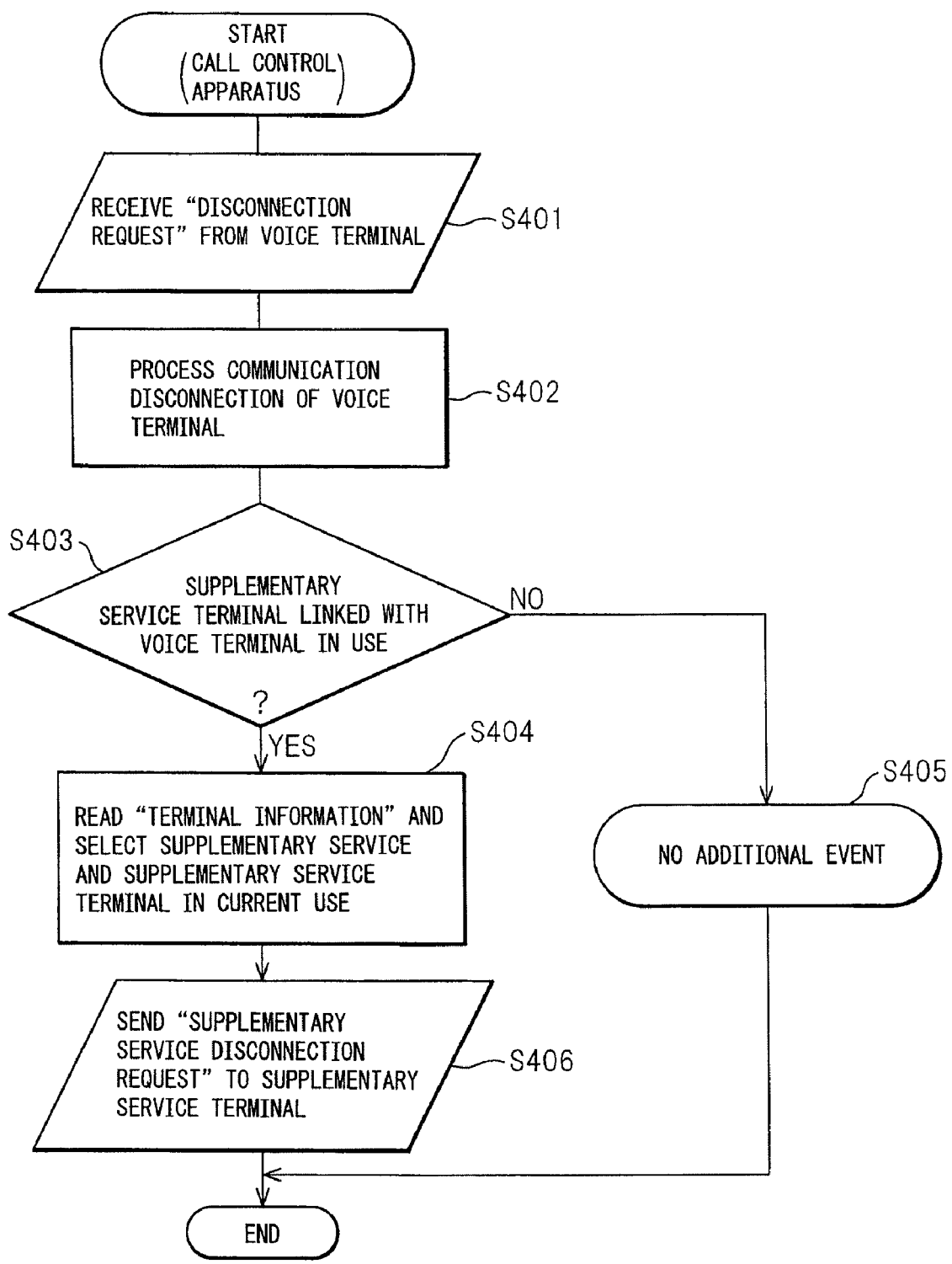
FIG. 12 is a view illustrating an example explaining the flow of supplementary service termination of the embodiments.
Figure 13:
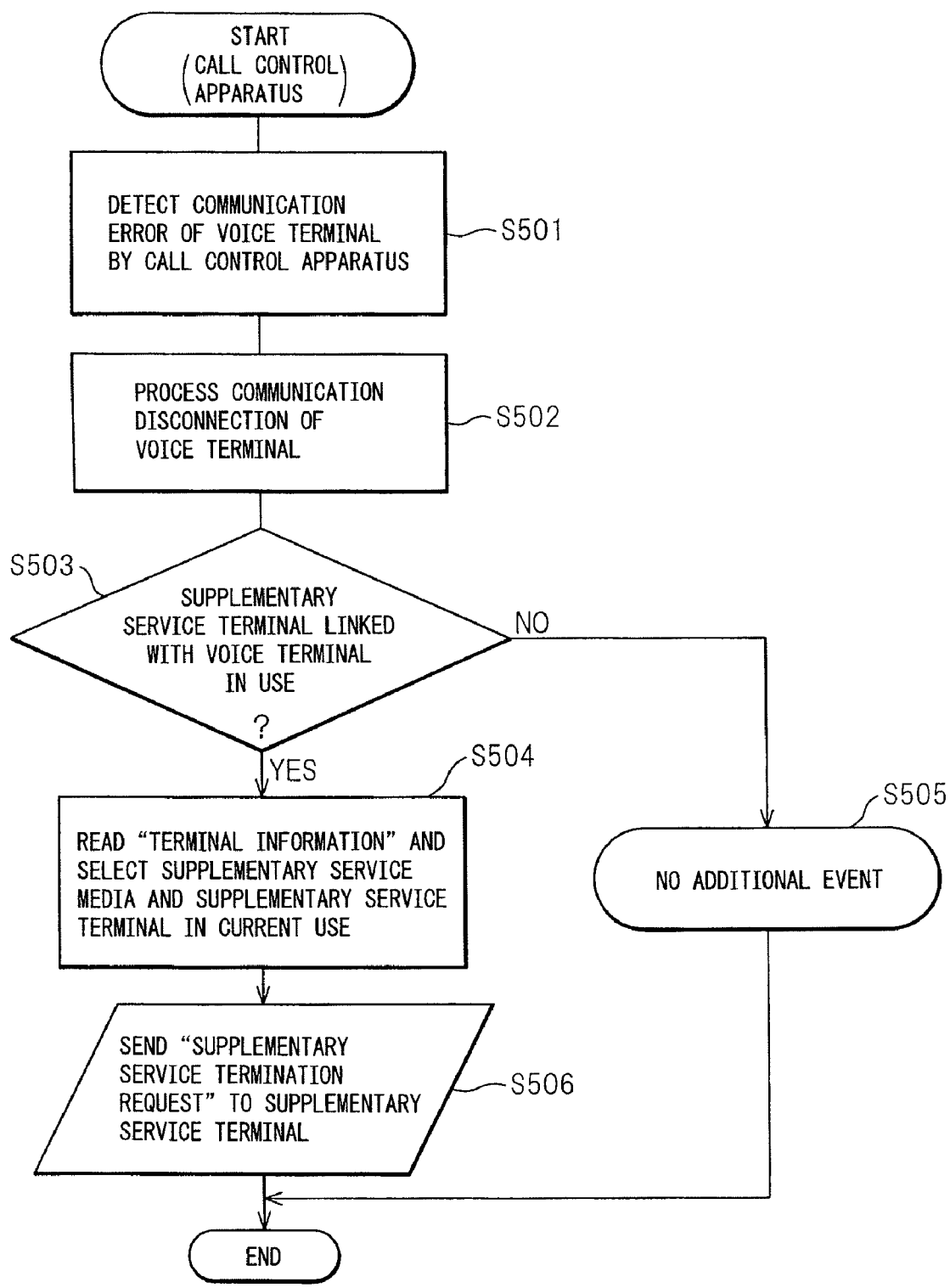
FIG. 13 is a view illustrating a different example explaining the flow of supplementary service termination of the embodiments.

FIG. 12 to 13 are views for explaining the flow of termination of a supplementary service according to the present embodiment. FIG. 12 illustrates one example, and FIG. 13, a different example.

In FIG. 12, if the call control apparatus 21 receives the instruction of a "disconnection request" from the voice terminal 22 of the user A for example, the voice communication disconnection processing is carried out according to the instruction (S401 and 402). Next, the call control apparatus 21 uses the "terminal information" of the subscriber management unit 42 to check the supplementary service media and supplementary service terminals 23, 25 in current use that are registered to be linked with the voice terminal 22 and the voice terminal 24 of the other user (S403 and 404). Further, the "supplementary service disconnection request" is sent to the supplementary service terminals 23, 25 (S406). If there is no supplementary service terminal in current use registered to be linked with the voice terminal (S403), the processing ends (S405).

FIG. 13 assumes a case where a communication error of the voice terminal is detected by the call control apparatus 21 (without receiving a "disconnection request" from the voice terminal) and communication disconnection processing is forced (S501 and 502). The processing thereafter (S502 to 506) is the same as the processing of FIG. 12 (S402 to S406).

Thus, in comparison to the telephone supplementary service communication system of the related art (Japanese Laid-Open Patent Publication No. 2006-270837), the user friendliness is significantly improved according to the embodiment. Specifically, the user is able to know in advance what communication media is available with another user and can select a communication media and when to use it by his own actions. Thereby, realization of a friendly service easy for the user to intuitively use is possible. Accordingly, this greatly contributes to the expansion of telephone supplementary services.

All examples and conditional language recited hereinbefore are intended for pedagogical purposes to aid the reader in understanding the principles of the invention and the concepts contributed by the inventor to furthering the art and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

DESCRIPTION OF NOTATIONS

1 communication system
2 videophone terminal
3, 5 supplementary service terminal
4 voice terminal
21 call control apparatus
22, 24 voice terminal
23, 25 supplementary service terminal
26, 28 video
27, 29 chat

What is claimed is:

1. A telephone supplementary service communication control system comprising a specified voice terminal, a plurality of telephone supplementary service terminals and a communication control apparatus, wherein
the communication control apparatus is configured to register the voice terminal and the telephone supplementary service terminals, as one virtual terminal, by linking these terminals together, manage and control a running and termination of the telephone supplementary service terminals while linking with a running and termination of the voice terminal, and
the communication control apparatus comprises a supplementary service starting unit to monitor a communication start state of the voice terminal and start a supplementary service by the plurality of telephone supplementary service terminals linked with the voice terminal.

2. A telephone supplementary service communication control system as set forth in claim 1, wherein the communication control apparatus comprises a subscriber management unit managing "control information" of service information agreed upon between a carrier and a subscribed user and "user information" mapped to "terminal information", as "voice information" and "supplementary service information", relating to physical configurations of the terminals owned by each subscriber.

3. A telephone supplementary service communication control system as set forth in claim 2, wherein the communication control apparatus further comprises a unit notifying the telephone supplementary service terminal of an available supplementary service in cases when there is a registered non-voice supplementary service available between users after communication has begun.

4. A telephone supplementary service communication control system as set forth in claim 1, wherein the communication control apparatus further monitors a communication termination state of the voice terminal and terminates provision of a desired service for the telephone supplementary service terminal, while linking with a termination of a communication state, in which telephone supplementary service terminal the desired service has been selected and run.

5. A telephone supplementary service communication control system as set forth in claim 1, wherein the telephone supplementary service terminal provides information on available supplementary services notified from the communication control apparatus to a user by a screen display or guidance, and the communication control apparatus is instructed by the user to select and run a desired service.

6. A telephone supplementary service communication control system as set forth in claim 5, wherein the telephone supplementary service terminal registers linkage with supplementary service satisfying user contract information in the communication control apparatus.

7. A telephone supplementary service communication control system as set forth in claim 1, wherein the telephone supplementary service terminal comprises a communication media selection unit displaying with an icon an available supplementary service notified from the communication control apparatus, and the communication control apparatus is instructed by a user's clicks on the icon to provide a desired service.

8. A telephone supplementary service communication control method in a system comprising a specified voice terminal, a plurality of telephone supplementary service terminals and a communication control apparatus, the method carried out by the communication control apparatus comprising:

registering the voice terminal and the telephone supplementary service terminals, as one virtual terminal, by linking these terminals together, managing and controlling a running and termination of the telephone supplementary service terminals while linking with a running of the voice terminal, monitoring a start of a communication by the voice terminal and starting a supplementary service by the telephone supplementary service terminals while linking with the start of the communication, and monitoring a termination of a communication by the voice terminal and terminating a supplementary service by the telephone supplementary service terminals while linking with the termination of the communication.

* * * * *